Jan. 17, 1933.  W. D. HAWK  1,894,684
AUTOMATIC ADVERTISING STATION ANNOUNCING SYSTEM AND METHOD
Filed June 17, 1929    6 Sheets-Sheet 1

Inventor
Walter D. Hawk,
Lyon & Lyon
By
Attorneys

Jan. 17, 1933.    W. D. HAWK    1,894,684
AUTOMATIC ADVERTISING STATION ANNOUNCING SYSTEM AND METHOD
Filed June 17, 1929    6 Sheets-Sheet 3

Inventor
Walter D. Hawk;
By Lyon & Lyon
Attorneys

Jan. 17, 1933.  W. D. HAWK  1,894,684
AUTOMATIC ADVERTISING STATION ANNOUNCING SYSTEM AND METHOD
Filed June 17, 1929   6 Sheets-Sheet 4

Inventor
Walter D. Hawk;
By Lyon & Lyon
Attorneys

Patented Jan. 17, 1933

1,894,684

UNITED STATES PATENT OFFICE

WALTER D. HAWK, OF LOS ANGELES, CALIFORNIA

AUTOMATIC ADVERTISING STATION ANNOUNCING SYSTEM AND METHOD

Application filed June 17, 1929. Serial No. 371,382.

This invention relates to automatic advertising station announcing systems of the type useful, for example, in connection with motor vehicles of any description for announcing to the passengers in said vehicles the next station or stop at which the vehicles are stopped, in order that the passengers may be apprised, before and as the stop is made, of the name of the street or other station at which they may wish to leave the vehicle.

The invention, furthermore, relates to automatic advertising station announcing methods.

One of the principal objects of the invention is to make provision for announcing the stations with accuracy.

Another very important object is to exhibit to the patrons of motor coach or bus lines, simultaneously with the name of the next station, the advertisement of a merchant or other advertiser located at or adjacent to said station.

Another object is to provide a system of this character employing a screen upon which the names of the stations are projected so as to be readily visible to the passengers of the vehicle on which the system is installed.

A very important object of the invention is to make it serve as an advertising medium in connection with the announcing of the stations.

Another object is to make provision for accurately positioning the names of the stations on the strip that carries the names of said stations.

Another object is to construct a system of this character that will employ a motion picture film, the names of the stations being photographed on said film and then magnified so that said names are readily visible to the occupants of the vehicle on which the system is installed.

Another important object is to provide a method whereby accuracy in the spacing of the names of the stations on the film is accomplished.

Further objects and advantages will appear in the subjoined detailed description.

The invention, to be hereinafter described in detail, includes a projector in which operates film provided with the names of the stations and with advertisements of merchants or other advertisers, a lens or lenses of the projector suitably magnifying the advertisements and the correlated names of the stations so that said advertisements and names can be easily read by the occupants of the vehicle. The projection of the advertisements and names of the stations is made upon a suitable screen that is preferably positioned at the forward end of the vehicle in an elevated position. The spacing of the names of the stations on the strip with their correlated advertisements is proportionate to the distances between said stations so that the proper synchronization will result in the showing of the station name and advertisement and arrival of the vehicle at said station.

The drive shaft of the projector is suitably geared to one of the operating members of the vehicle so as to obtain the necessary ratio between the travel of the strip and that of the vehicle, thus to secure the synchronization mentioned above.

The accompanying drawings illustrate the invention.

Figure 1:
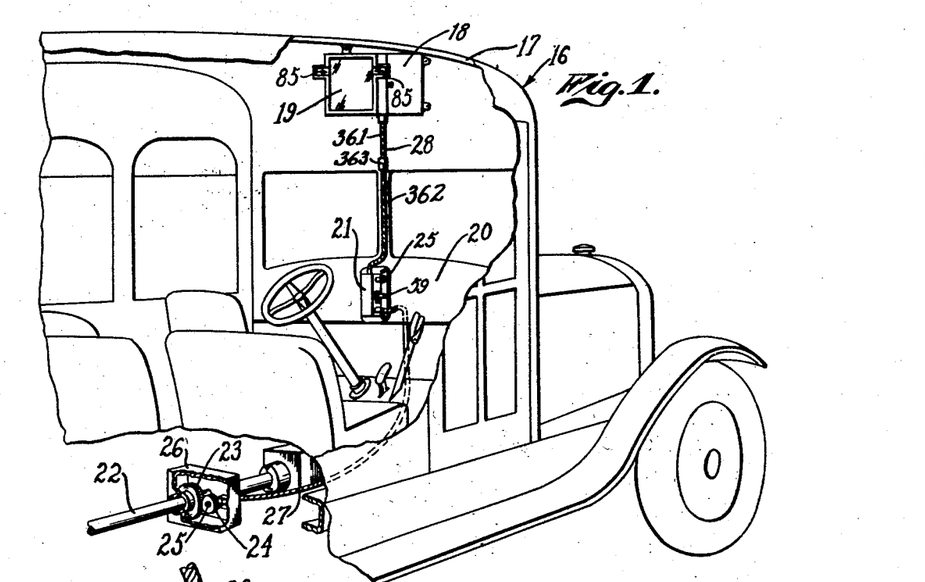
Figure 1 is a fragmental perspective view of a motor vehicle in which is installed an automatic station announcer constructed in accordance with the provisions of this invention.

Referring, more particularly, to Figure 1 of the drawings, a motor vehicle is indicated, in general, by the character 16. Suspended in the upper portion of the body 17 of the vehicle is a projector enclosing cabinet 18, the front of said cabinet 18 being provided with a screen 19 which, in this instance, is translucent. The screen 19 may be made, for example, of ground glass.

Mounted on the instrument board 20 of the vehicle is a speed reduction gear train, of which the case is indicated at 21. The propeller shaft of the vehicle is indicated at 22 and said shaft is provided with a spur gear 23 that meshes with a spur pinion 24 on a shaft 25. The gear 23 and pinion 24 are enclosed in a suitable case 26 which may be secured in any suitable manner to the vehicle. The pinion shaft 25 is connected by a flexible shaft 27 to the gear train enclosed in the case 21, and said gear train is connected by a flexible shaft 28 to the projector within the cabinet 18.

The foregoing will make clear the general arrangement of the various units which co-operate to produce the desired result and reference will now be had to the other views of the drawings for the details of construction of said units.

Figure 4:
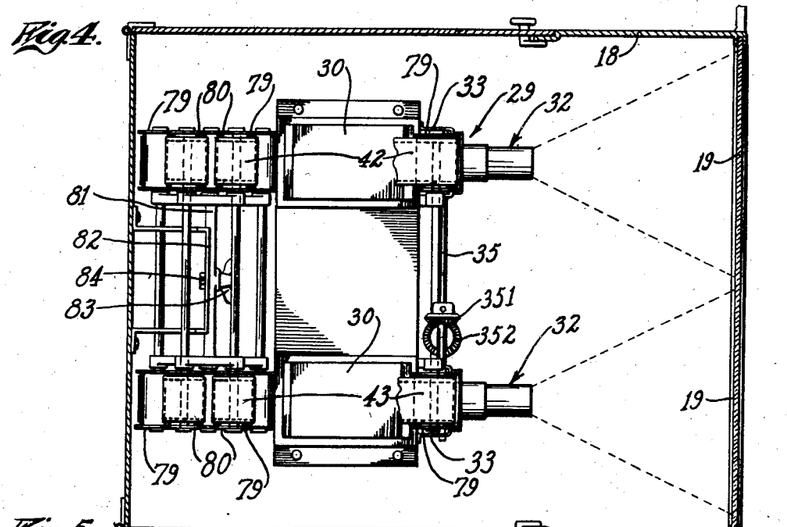
Figure 4 is an enlarged plan view of the projector, the cabinet in which the projector is mounted being shown in section.
Figure 5:
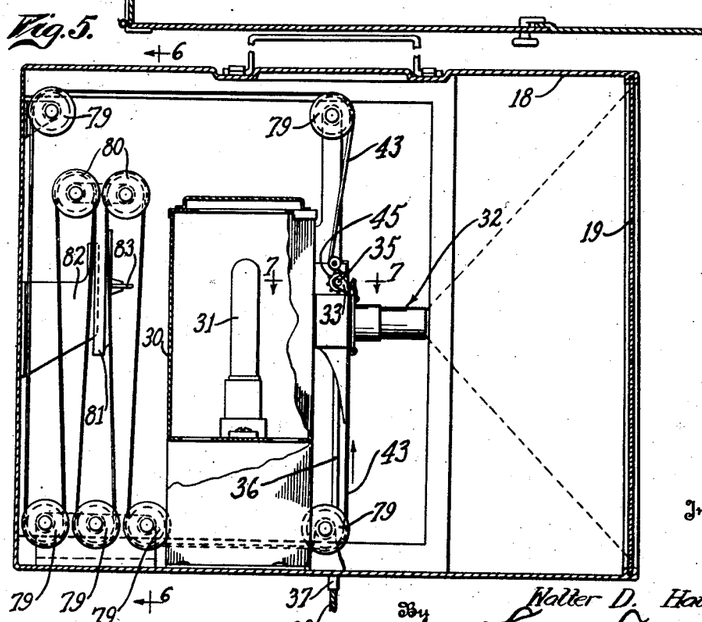
Figure 5 is a front elevation of Figure 4, one of the lamp housings being shown in section, as well as the cabinet.

The projector is indicated, in general, at 29, being suitably secured to the bottom of said cabinet. In this particular instance the projector is illustrated as of the duplex type or, in other words, of a type that simultaneously projects light through two film strips. The projector 29 is provided with two lamp housings 30 in each of which is an electrically operated lamp 31 and mounted on the front of each lamp housing 30 is a lens system 32 capable of projecting light rays from the lamp 31 onto approximately one-half of the screen 19. The light rays projected by the lens systems 32 illuminate different areas of the screen 19. While the light may be projected so as to cause the lettering on the different strips to appear on the screen in any desired relation, in the instance illustrated the lettering on one film is projected on the screen alongside of the projected image of the lettering of the other strip so that the names of the stations aline with the advertisements of advertisers located at said stations, respectively.

Mounted on the forward end of each lamp housing 30 is a bracket 33 which carries bearings 34, and extending through all of the bearings 34 is a single horizontal shaft 35. The shaft 35 is driven through mitre gears 351, 352 from a vertical shaft 36 which projects outside of the cabinet 18. The projecting end of the shaft 36 is provided with a suitable coupling 37 that couples the shaft 36 to the flexible shaft 28. Thus, the shaft 35 is operably connected with the gear train within the case 21. The shaft 28, in this instance, comprises sections 361, 362 detachably connected by a coupling 363.

Figure 6:
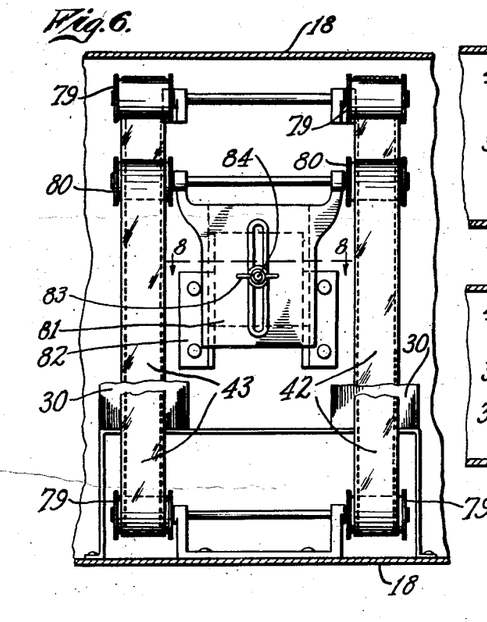
Figure 6 is a fragmental vertical view, partly in section, from the line indicated by 6—6, Figure 5.
Figure 7:
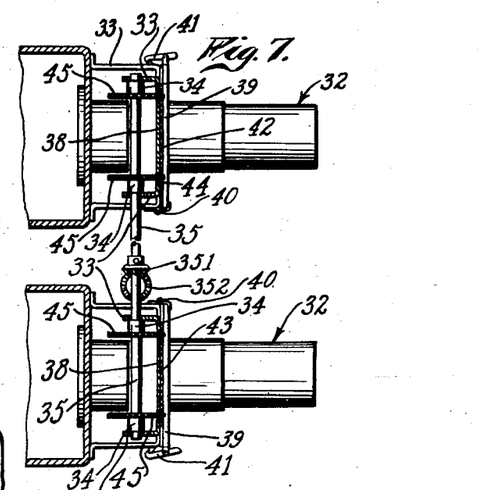
Figure 7 is an enlarged fragmental plan view, partly in section, from the line indicated by 7—7, Figure 5.
Figure 8:
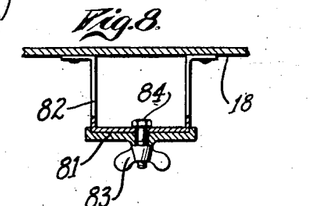
Figure 8 is a fragmental sectional detail on the line indicated by 8—8, Figure 6.

The forward end of each bracket 33 is provided with a film gate comprising a stationary member 38 and a movable member 39. The gate member 39, in this instance, is hinged at 40 to the bracket 33 and is provided with a suitable latch 41 for holding the gate member 39 closed.

Through the respective film gates extend film strips 42, 43, the strips being actuated by any suitable mechanism. In the present instance, the film strips are provided with perforations 44 engaged by sprockets 45 which are mounted on and turned by the shaft 35. In this particular instance, one portion of each of the lens systems 32 is supported by one of the brackets 33, while the other portion of each of said lens systems is supported directly on the associated lamp housing.

From the foregoing it will readily be seen that the two film strips will be operated in synchronism when the shaft 35 is turned.

Figure 2:
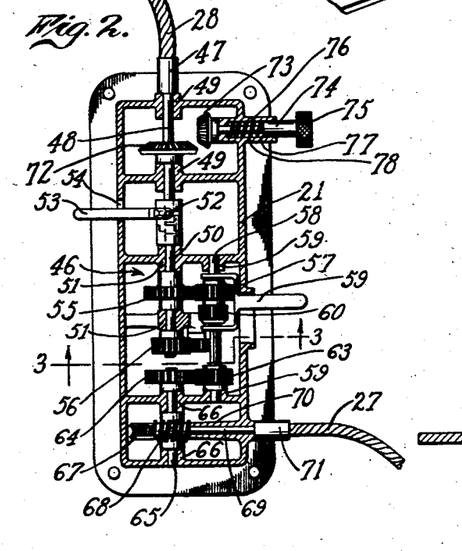
Figure 2 is a view of the speed reduction gear train, the case being shown in section.
Figure 3:
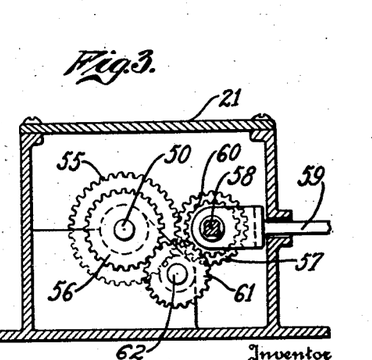
Figure 3 is an enlarged sectional elevation of the speed reduction gear train on the line indicated by 3—3, Figure 2.

Now referring more particularly to Figures 2 and 3 of the drawings, the case 21 hereinbefore referred to encloses a gear train which is indicated in general by the character 46, constructed as follows: The shaft 28 is connected by a suitable coupling 47 to a shaft 48 turning in bearings 49 of the case 21. Aligned with the shaft 48 is another shaft 50 turning in bearings 51 of the case 21. A simple clutch 52, of any suitable description, releasably connects the shafts 48, 50, being operated by a fork 53 which projects through an opening 54 in the case 21.

Secured to the shaft 50 are spur gears 55, 56, the spur gear 55 meshing with a spur pinion 57 which is shifted on a shaft 58 by a fork 59, said fork 59 also at the same time shifting another spur gear 60 on the shaft 58. The gears 57, 60 are integral and are splined on the shaft 58 in a manner common in gear shifts and well understood in that art. When the fork 59 is in the position illustrated in Figure 2, the gears 55, 57 are in mesh, but when the fork 59 is shifted from said position it disengages the gears 55, 57 and engages the gear 60 with an idler gear 61 mounted on a shaft 62 and also in mesh with the gear 56. Thus, by shifting the fork 59 into different positions, the shaft 48 may be driven in either direction.

Fixed to the shaft 58 is another spur gear 63 driven by a spur gear 64 fixed to a shaft 65 which turns in bearings 66 of the case 21. The shaft 65 is provided with a worm gear 67 driven by a worm 68 on a shaft 69 that turns in bearings 70 of the case 21. The shaft 69 is connected by a suitable coupling 71 to the flexible shaft 27.

In order that the shaft 48 may be turned by hand in either direction, for adjusting the film strips, there is provided on the shaft 48 a bevel gear 72 and adapted to be moved in and out of mesh with the gear 72 is a bevel pinion 73 on the inner end of a shaft 74 which projects outside of the case 21 and is provided with a knurled knob 75 whereby the shaft 74 may be readily turned.

The shaft 74 turns in a bearing 76 of the case 21 and is provided with a shoulder 77, between which and the inner end of the bore of the bearing 76 is a coil spring 78 which tends to thrust the shaft 74 outwardly and to yieldingly hold said shaft in its outer position, in which position the gears 72, 73 are out of mesh. By pressing the knob 75 inwardly, the gear 73 is caused to mesh with the gear 72, whereupon the operator may turn the knob 75 in one direction or the other to move the film strips in relation to the propeller shaft 22.

In this particular instance the film strips 42, 43 are preferably endless, and each is threaded upon a series of grooved pulleys 79 stationarily mounted in the cabinet 18. Each of said film strips also passes around a pair of grooved take-up pulleys 80 which are mounted on an adjustable slide 81 which is shiftably mounted on a bracket 82, being secured in the different positions to which it may be adjusted by a wing-nut 83 on a bolt 84 that passes through the bracket 82 and through the slide 81. By moving the slides 81 upwardly, any slackness in the film strips may be taken up. Thus the apparatus can employ film strips of different lengths, according to the number of names of stations that are contained on the film strips and the spacing of said names.

Figures 9, 10, 11, 12, 13:
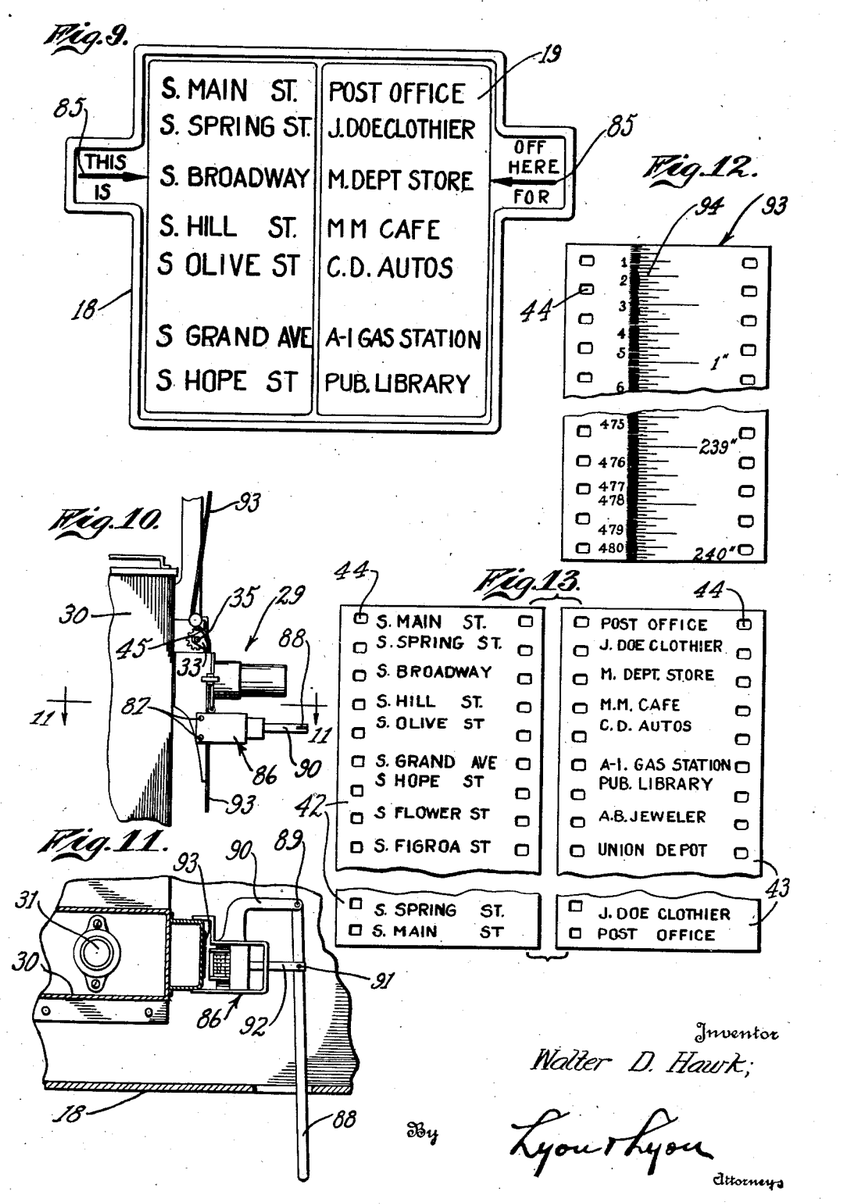
Figure 9 is an elevation of the projector, looking at the cabinet from the front.
Figure 10 is a fragmental view showing the front portion of the projector with a stamping mechanism mounted thereon for stamping the key strips with symbols.
Figure 11 is a horizontal section on the line indicated by 11—11, Figure 10.
Figure 12 is a broken view of the key strip.
Figure 13 is a broken view of the station announcing strip and the corresponding advertisement strip that operates in synchronism with the station announcing strip.

It is very important that the names of the stations be accurately positioned on the film strips in relation to one another so that when the film strips are operated, the names of the successive stations and the advertisements will accurately register with an indicator or indicators of any suitable description, such indicators, in this instance, being horizontal arrows 85 placed on the front wall of the cabinet, on opposite sides of the screen 19. The method and means by which this accuracy is attained are as follows:

Referring more particularly to Figures 10 and 11, 86 indicates a stamping or numbering device of any suitable description removably mounted on one of the brackets 33 by screws 87, or their equivalents. This numbering device 86, in this instance, is a numbering machine of a type that is well known in the art relating to numbering machines and, accordingly, the construction and operation of said numbering machine are not necessary to describe herein.

The member 88, by which the numbering machine is operated, in this instance, is in the form of a lever having its fulcrum at 89 on an arm 90 of the numbering machine. The member 88 is pivoted at 91 to a rod 92 that operates the number die cylinder.

To obtain a film strip properly provided with the names of the stations, the following procedure is carried out: A key negative is made by first photographing on raw stock a scale of linear measurement and then developing and fixing the film in a manner well understood in the photographic art. A positive key film strip is then printed from said negative in a manner well understood in the photographic art, thus producing the strip indicated at 93 in Figure 12, said strip having thereon the scale 94. This positive key strip is developed and then fixed, in a manner well understood in the photographic art.

Inasmuch as either the negative or positive strips may be used for receiving the symbols, which are printed on the strip, in a manner hereinafter described, this strip will be referred to hereinafter simply as the key strip. Also, it is not absolutely necessary that the key strip be calibrated or provided with a linear scale, but such scale will facilitate the preparation of the station announcing strip and advertising strip. In any event, whether the strip bear the linear scale or not, it is herein termed the key strip.

Those parts of the invention hereinbefore described having been installed on the vehicle, as illustrated in Figure 1, with the stamping device 86 in place, the vehicle will be driven on a definite route over which it is to thereafter operate on regular schedule, and the vehicle will be brought to a stop at one of the stations. The key strip 93 having previously been placed in the projector, in the manner hereinbefore described, the operator will actuate the lever 88 to thereby cause the stamping device 86 to impress the number "1" on the key strip 93. The operator will have in his possession a list of the names of the stations along the assigned route, and the names of the successive stations will be designated on the list by symbols. These symbols may be, for example, numerals and the same are preferably in numerical order as, for example, 1, 2, 3, 4, et cetera, the number "1" being associated with the name of the station at which the vehicle has been brought to a stop at the beginning of its assigned route.

The vehicle will then be driven along the assigned route to the next succeeding station on said route and stopped at said station, and the operator will again actuate the lever 88 so as to imprint on the key strip the number "2", which number, as above stated, has been associated on the list of stations with the name of the second station stopped at. This procedure will be continued until the vehicle reaches the end of the assigned route, whether the route be a circular one that ends at the starting point or whether it be a shuttle route. In the event of it being a shuttle route, the list of station names will have the numbers or other symbols assigned so that the names of the stations on the return trip will come in the reverse order to that of the outward trip.

After the key strip has thus been provided with station indicating symbols, said strip will be employed as a guide for the making of a station name strip and an advertising strip. This is done by projecting green colored letters, that spell the station names and the advertisement, on a translucent screen and photographing said letters, the spaces between adjacent station names being proportional to the distances between the adjacent symbols that stand for said station names. The distances are easily read off on the scale on the key strip, if the strip is provided with such scale and, otherwise, a scale may be laid on the key strip to measure the distances between station symbols, and the station names will then be lettered on cards, with the names of adjacent stations spaced apart some multiple of the spacing as found on the key strip.

The lettering that is on said cards will be projected on the translucent screen mentioned above and, accordingly, the successive names on the translucent screen will appear at the correct intervals, which intervals, as just mentioned, are multiples of the intervals between adjacent symbols on the key strip.

Figure 14:
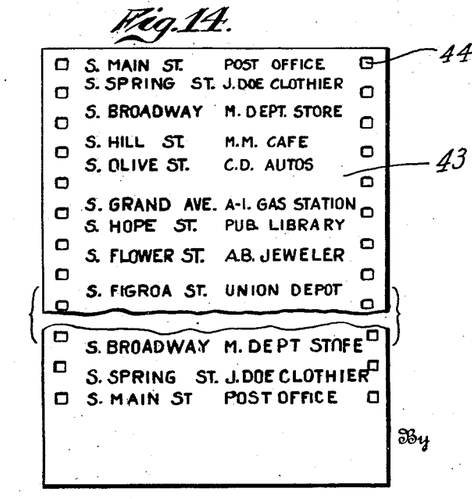
Fig. 14 is a broken view of a slight modification of the station announcing strip, the station names and advertisements appearing on a single strip.

The names of business establishments located at the stations, at which the vehicle stops, may be photographed on the same strip with the station names, as indicated in Figure 14, or on a separate strip, separate station name and advertisement strips being shown in Figure 13. Whether the single strip is employed or two strips, will depend upon the type of projector and the projector illustrated and described herein is adapted for the reception of separate strips, one containing the station names and the other containing advertisements. If the advertisements are on a separate strip, the same care will be exercised in properly spacing them so that when the two strips are moved at the same rate of speed, perfect synchronism will result or, in other words, the name of the advertised establishment will be aligned in the projector with the name of the station at which the establishment is located.

A simpler and, perhaps, preferable method of making the station name and advertisement strips is to photograph the station names and advertisements directly upon said strips by transporting a raw film from station to station on the route of the vehicle, moving the raw film into successive exposure positions by distances that are proportional to the distances between the successive stations and photographing on the film the names of the stations in the order in which the film arrives at said stations.

Figure 17:
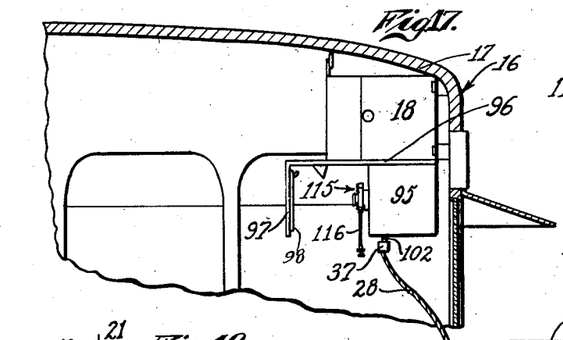
Figure 17 is a fragmental perspective view, corresponding to a portion of Figure 1, showing the camera, the legend card and the holder for said card.
Figure 18:
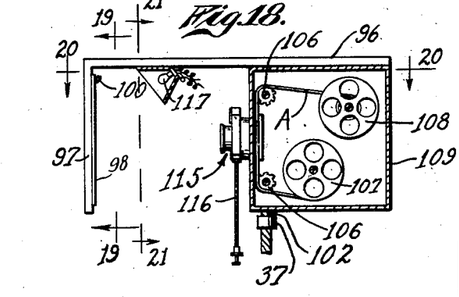
Figure 18 is an enlarged view of a portion of Figure 17, the camera being shown partly in section.

To photograph the station names and advertisements directly on the strips, additional apparatus is provided as follows: There is provided a camera 95 which, in the present instance, is of the duplex type or, in other words, a type which makes two exposures on separate film strips. The camera 95 is secured in any suitable manner to a bracket 96 which is suitably supported in the vehicle just beneath the projector 18. The bracket 96 has a downward extension 97 that constitutes a holder for supporting cards 98, 99, only one of each of which is illustrated. The cards 98 bear the names of the stations, which names are to be photographed by one side of the camera on one of the film strips, and the cards 99 bear advertisements which are to be photographed by the other side of the camera on the other film strip. In the present instance, the cards 98, 99 are suspended from hooks 100 carried by the support 97, said hooks being engaged with perforations 101 near the upper edges of the cards 98, 99.

The camera 95 is of any suitable construction that will permit of movement of the film strips by operation of the vehicle propeller shaft 22 or any other part of the mechanism of the vehicle that operates only when the vehicle is being propelled over the road. In the present instance, the shaft 28, having been first disconnected from the projector 18, is connected with a vertical shaft 102 of the camera 95. This is done by removing the shaft section 361 so as to shorten the shaft 28.

Figure 19:
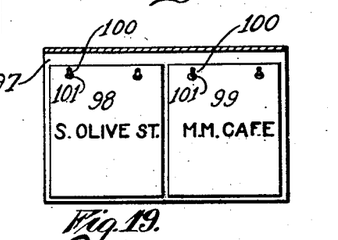
Figure 19 is a vertical view, partly in section, from the line indicated by 19—19, Figure 18.
Figure 20:
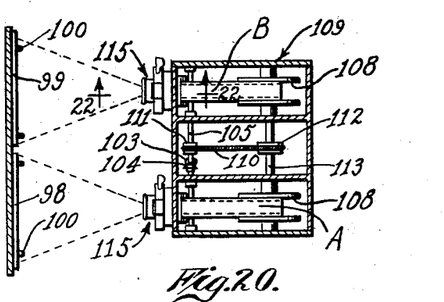
Figure 20 is a plan section on the line indicated by 20—20, Figure 18, omitting the lamps.

The shaft 102 is connected by mitre gears 103, 104 with a transversely extending shaft 105 on which are mounted film-engaging sprockets 106, one set of said sprockets engaging a film strip A and a second set of sprockets engaging the film strip B. Each of the film strips A, B is wound on a feed spool 107 and a take-up spool 108 within the box 109 of the camera. A slip driving connection consisting of a belt 110 and pulleys 111, 112 connects the shaft 105 with the take-up spool shaft 113.

Figure 21:
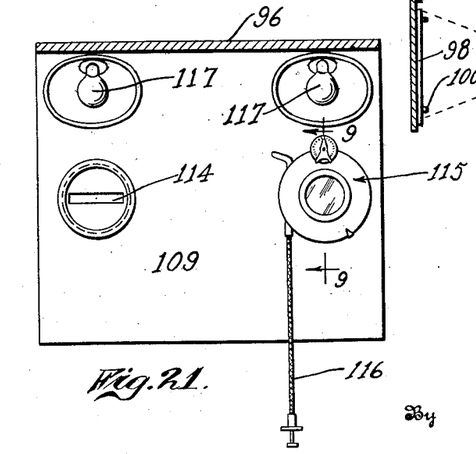
Figure 21 is a vertical view, partly in section, from the line indicated by 21—21, Figure 18, one of the objective lenses being omitted.
Figure 22:
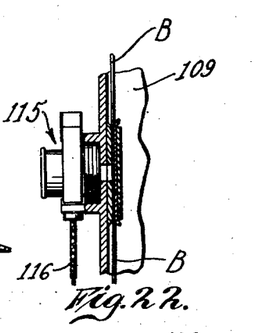
Figure 22 is an enlarged fragmental view, mainly in section, from the line indicated by 22—22, Figure 20.

The camera is provided with an orifice in line with each film strip, only one of said orifices being seen in Figure 21 at 114. The camera is provided with two lens systems 115 and the usual shutter operating mechanisms are employed, only one of which is shown in Figure 21, at 116. The shutters and their operating mechanisms need not be described in detail herein, since the construction and operation of such shutters and shutter operating mechanisms are well understood in the art relating thereto.

Fixed to the under side of the bracket 96 between the card support 97 and the camera is a lamp or lamps 117 for illuminating the cards 98, 99 when the names and advertisements on said cards are to be photographed.

To photograph the station names and advertisements directly on the film strips, the camera shutters being closed and the lamps 117 illuminated, the vehicle will be driven on the predetermined route, starting at one of the stations on said route. The vehicle will be stopped at this first station and the cards 98, 99 bearing, respectively, the name of the station and the name of the establishment that is to be advertised and that is located at said station, will be hung up on the support 97. The camera shutters will then be operated, in a manner well understood in the art relating to cameras, to make exposures. The vehicle will then be driven along its route to the next succeeding station and other cards containing the appropriate station name and advertisement will be hung up and other portions of the films A, B will be exposed by operation of the shutters.

This alternate driving of the vehicle to succeeding stations and operation of the camera while the vehicle is stopped at said stations will be proceeded with until the vehicle has reached the end of its route. The film strips A, B will then be removed from the camera, developed and fixed in the customary manner, thus producing negative name strips. These negative strips may then be placed in the projector for projecting the names upon the screen 19 or, if desired, positives may be printed from said negatives and then such positives be placed in the projector for projection of the names they bear onto the screen 19.

Having, then, placed the name strips in the projector in the manner illustrated, for example, in Figure 5, the camera 95 will be demounted and the shaft 28 coupled to the shaft 36 of the projector. The vehicle will be driven to one of the stations along its route and the operator will then operate the gearing 46 by hand, if that is necessary, to cause the name of the station, at which the vehicle has been brought to a stop, to exactly register with the arrows 85, as indicated in Figure 9. The system is now ready for proper operation and the vehicle may proceed on its route and the station name strip and advertisement strip will be actuated so that as the vehicle arrives at the successive stations, the names of said stations will accurately register, successively, with the arrows 85. It will be noted that the names of a number of stations are visible on the screen at one time, thus enabling the passengers of the vehicle to note before they reach their station the near approach of the vehicle thereto. Thus, the films bearing the station names and advertisements, under this method, are transported from station to station of the route, and the film is moved distances corresponding to the distances that the raw film was moved during the operation of photographing the station names and advertisements, into positions to expose to view on the screen the names of the stations as and in the order in which the name strip arrives at the successive stations.

It will be readily understood that the projection of the station names and advertisements on the screen as just described will be the same whatever the method employed for producing the station name and advertisement strips.

Figure 15:
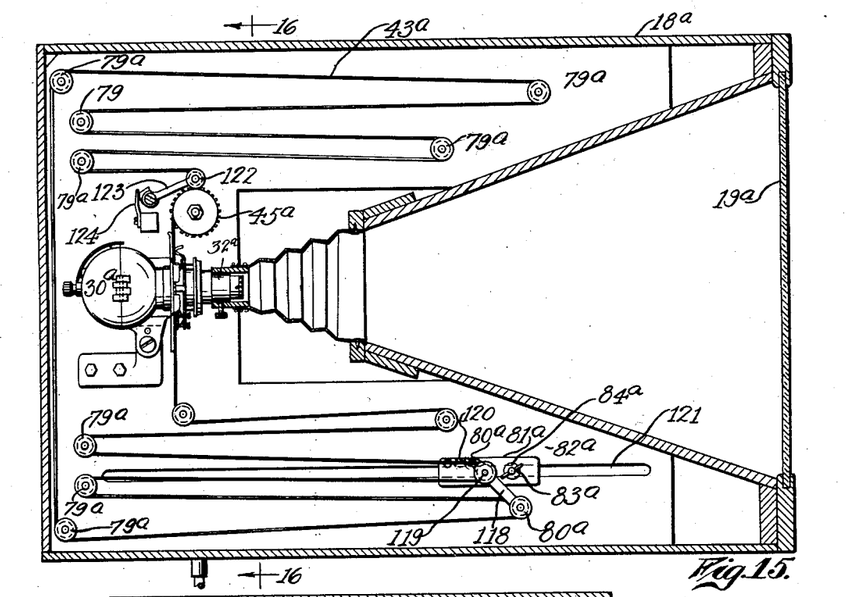
Figure 15 is a longitudinal view, mainly in section, of a different form of projector than illustrated in Figure 4.
Figure 16:
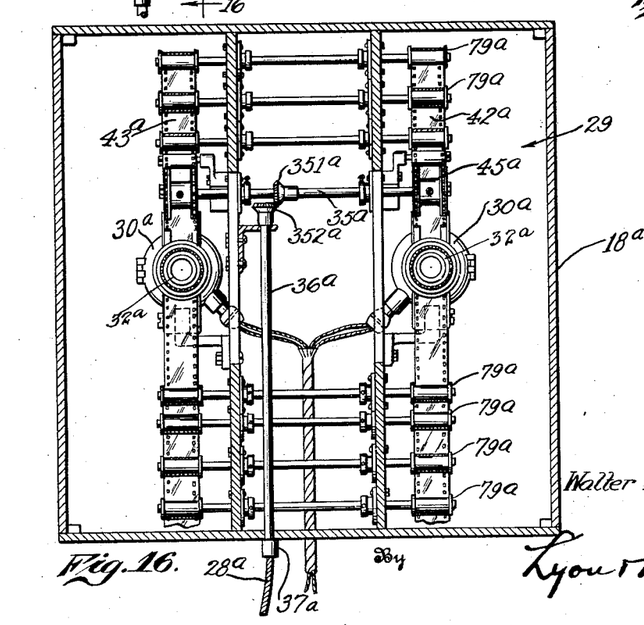
Figure 16 is a vertical section on the line indicated by 16—16, Figure 15.

Referring, now, more particularly to Figures 15 and 16, illustrating a modification of the projector, the elements that functionally correspond with those hereinbefore described are indicated by the same reference characters with the suffix a. One of the important differences between this form of the projector and that hereinbefore described is that in this instance the strips 42ª, 43ª are mainly positioned above and below the lamp housings 30ª, instead of rearwardly thereof as in the projector illustrated in Figure 5, thus enabling a material shortening of the projector and, at the same time, removing a large portion of the strips from positions immediately rearward of the lamp housings. In this instance, also, one of the take-up pulleys 80ª of each set of said take-up pulleys is mounted on an arm 118 which is pivoted at 119 to the slide 81ª. A spring 120 is secured at one end to the arm 118 and at its other end to the slide 81ª, so as to yieldingly hold the pulley 80ª on the lower end of said arm toward the right in Figure 15, thus to keep the strip taut. It is to be understood that there are two of these devices for maintaining the strips taut, one for each strip, though from the nature of the view illustrated in Figure 15 only one such device can be seen.

Strips of different lengths can be readily accommodated in the projector by adjusting the slide 81ª along the bracket 82ª, in this instance the bolt 84ª extending through a slot 121 in the bracket 82ª.

Positioned adjacent to the sprockets 45ª are pressure rollers 122 mounted on arms 123 which are yieldingly held toward the sprockets 45ª by springs 124, said rollers 122 preventing the strips from jumping off of the sprockets.

While I have illustrated and described the system as employing motion picture film for the recording strips, it is to be understood that said strips may be of any suitable material. Furthermore, it is to be understood that the station names and the symbols employed for designating the places where the station names are to be placed on the strips are characters which, in some instances, form words constituting the names of the stations and, in other instances, constitute numerals or other suitable symbols whereby the positions that the station names are to occupy on the strips are provisionally indicated. It is important that this be clearly understood for the reason that, within the scope of the invention, the strip that is provided with station names on the initial run of the vehicle on its route may itself be used on subsequent runs, or a replica of said strip may be employed.

Furthermore, it is to be understood that when the station name strip is not the one originally produced, it may reproduce the station names of the original or, if symbols are employed on the original, the names of the stations may be substituted on the reproduced strip in place of the symbols, said symbols being employed for obtaining accuracy in the placement of the station names on the reproduced strip, since the distance between adjacent symbols can be measured with a scale and a multiple of said distance employed in placing the station names on a card that is photographed, as hereinbefore described.

I claim:

1. In an automatic station announcing system, a reduction gear train, a means to connect the reduction gear train to the running gear of a vehicle, a camera provided with a means for continuously moving a strip of film in the camera, a means operably connecting the film moving means with the reduction gear train, manually operated means to expose the film when the vehicle is stationary, and a support for holding a card in front of the camera.

2. The combination with a vehicle of a means connected with the running gear of the vehicle for operating a recording film in synchronism with said vehicle as said vehicle runs between stations on a definite route, one or more cards bearing the names of stations of said route, and a means manually operable independent of the film operating means to photograph the card bearing the name of a station on the film when the vehicle comes to a stop at said station.

3. In an automatic station announcing system, a reduction gear train, a means to connect said gear train to the running gear of a vehicle, a means operated by the gear train for positively engaging and moving a recording film at a speed that is proportional to the speed of the vehicle, one or more cards bearing the names of stations along the route traversed by said vehicle, and a means manually operable independent of the film moving means to photograph the name of a station from the card on the film when the vehicle comes to a stop at said station.

4. In the method of preparing the strips for station announcing, the steps of transporting a light sensitive film between stations on a definite vehicle route, moving the film linearly during the transportation thereof by distances that are proportional to the distances the film is transported between said stations, transporting with the film the names of said stations, posting the names of the stations successively in the order in which the vehicle arrives at the stations, and photographing on the film the posted names when and in the order that the vehicle arrives at the successive stations known by said names.

5. In the method of preparing the strips for station announcing, the steps of transporting a light sensitive film between stations on a definite vehicle route, moving the film linearly during transportation thereof by distances that are proportional to the distance the film is transported between said stations, holding the film stationary for an interval of time upon arrival at each station, posting the names of the stations successively in the order in which the vehicle arrives at the stations, and photographing on the film the posted names when the film is stationary at the successive stations known by said names.

6. In the method described, the steps of operating a vehicle between stations, operating a light sensitive film on the vehicle at a speed that bears a constant ratio to the speed of the vehicle, stopping the operations of the vehicle and the film for an interval of time at the successively arrived at stations, posting on the vehicle the name of each station in the order of the arrival of the vehicle at the stations, and photographing the posted names of the stations on the film while the vehicle and film are stationary at the stations known respectively by said names.

Signed at Los Angeles, California, this 10th day of June, 1929.

WALTER D. HAWK.